United States Patent
Juarez (10) Patent No.: US 9,388,925 B2
(45) Date of Patent: Jul. 12, 2016

(54) TUBULAR CONNECTION CENTER SHOULDER SEAL

(71) Applicant: ULTRA PREMIUM OILFIELD SERVICES, LTD., Houston, TX (US)

(72) Inventor: Alejandro Juarez, Cypress, TX (US)

(73) Assignee: ULTRA PREMIUM OILFIELD SERVICES, LTD, Houston, TX (US)

( * ) Notice: Subject to any disclaimer, the term of this patent is extended or adjusted under 35 U.S.C. 154(b) by 125 days.

(21) Appl. No.: 13/827,195

(22) Filed: Mar. 14, 2013

(65) Prior Publication Data

US 2014/0217725 A1 Aug. 7, 2014

Related U.S. Application Data

(60) Provisional application No. 61/760,833, filed on Feb. 5, 2013.

(51) Int. Cl.
| | |
|---|---|
| *F16L 25/00* | (2006.01) |
| *F16L 21/00* | (2006.01) |
| *E21B 17/042* | (2006.01) |
| *E21B 17/08* | (2006.01) |

(52) U.S. Cl.
CPC .............. *F16L 21/00* (2013.01); *E21B 17/042* (2013.01); *E21B 17/08* (2013.01); *Y10T 29/49826* (2015.01)

(58) Field of Classification Search
USPC .................................. 285/333, 334, 355, 390
See application file for complete search history.

(56) References Cited

U.S. PATENT DOCUMENTS

| | | | |
|---|---|---|---|
| 4,591,195 A | | 5/1986 | Chelette et al. |
| 4,611,838 A | | 9/1986 | Heilmann et al. |
| 4,676,529 A | * | 6/1987 | McDonald ..................... 285/334 |
| 4,753,460 A | | 6/1988 | Tung |
| 5,415,442 A | | 5/1995 | Klementich |
| 5,462,316 A | | 10/1995 | Street et al. |
| 5,765,836 A | | 6/1998 | Banker et al. |
| 6,041,487 A | | 3/2000 | Banker et al. |
| 2008/0238094 A1 | | 10/2008 | Craig et al. |
| 2011/0133448 A1 | * | 6/2011 | Williams et al. .............. 285/333 |

OTHER PUBLICATIONS

PCT/US2014/013311; International Search Report, May 9, 2014.
PCT/US2014/013311; Written Opinion, May 9, 2014.

* cited by examiner

*Primary Examiner* — Aaron Dunwoody
(74) *Attorney, Agent, or Firm* — Morgan, Lewis & Bockius LLP (57) ABSTRACT

A metal-to-metal sealing system connecting first and second tubular members includes a first seal configuration on the first tubular member and a second seal configuration on the second tubular member. The first seal configuration includes a first annular groove and a first annular tooth, and the second seal configuration includes a second annular groove and a second annular tooth. The second annular tooth is positioned within the first annular groove with the second annular tooth face engaging the first annular shoulder face to define a first shoulder. The first annular tooth is positioned within the second annular groove with the first annular tooth face engaging the second annular shoulder face to define a second shoulder. Locations of primary sealing contact of surfaces of the members are spaced axially away from the first and second shoulders.

23 Claims, 4 Drawing Sheets

TUBULAR CONNECTION CENTER SHOULDER SEAL

CROSS-REFERENCES

This application claims the benefit if U.S. Provisional Application Ser. No. 61/760,833, filed Feb. 5, 2013, the entirety of which is incorporated herein by reference.

TECHNICAL FIELD

The present application relates to tubular connections of the kind commonly used in the oil and gas industry that include a center-shoulder seal and, more particularly, to a center-shoulder seal configuration that separates radial and hoop forces of metal-to-metal contact sealing surfaces from the center shoulders.

BACKGROUND

The Oil & Gas upstream production industry drills wells of ever increasing depth and complexity to find and produce raw hydrocarbons. The industry routinely uses steel pipe (Oil Country Tubular Goods) to protect the borehole (casing) and to control the fluids produced therein (tubing). Casing and tubing are made and transported in relatively short lengths and installed in the borehole one length at a time, each length being connected to the next. As the search for oil and gas has driven companies to drill deeper and more difficult wells, the demands on the casing and tubing have grown proportionately greater in terms of both tensile and pressure forces. The developing technology of deviated and horizontal wells have exacerbated this trend, adding to the casing and tubing requirements a further consideration of increasing torsional loads.

Two general classes of connectors exist within this field. The most common is the threaded and coupled connector, wherein two pin, or male threads, which are machined on the ends of two long joints of pipe, are joined by two box, or female threads, machined on a relatively short member, a coupling, with a larger outside diameter than the pipe, and approximately the same inside diameter. The other class is the integral connector, wherein the pin member is threaded onto one end of a full-length joint of pipe and the box member is threaded into the second full-length joint. The two joints can then be directly joined without the need for an intermediate coupling member. The ends of the pipe body may be processed further to facilitate the threading of the connection.

The prior art demonstrates the use of a variety of different thread, shoulder and seal configurations for oil country tubular goods. One type of shoulder and seal combination used in the prior art is the so-called center shoulder seal configuration. As used herein, a "center shoulder seal" is understood to mean a section of a connection disposed between at least two threaded portions, which section exhibits directly contacting surfaces between the pin and box members, or between the pin and box members and a third component such as an annular sealing sleeve, so that the section provides a seal for preventing the passage of liquid or gas through (across the threads of) the assembled connection.

U.S. Pat. Nos. 5,415,442 and 5,462,315 disclose a center shoulder configuration, represented in FIG. 1, in which a total of five metal-to-metal seals are created during assembly (make-up) of the connection: two metal-to-metal seals at the exterior beveled edges of the locked double shoulder seal 400 where sealing surfaces 418 and 438 are in contact and where sealing surfaces 422 and 442 are in contact; and, three zero clearance surfaces at the interior of the locked double shoulder seal 400, one 410 at the wall surface where sealing cylindrical surfaces contact, another zero clearance surface where the annular face surface of the pin shoulder 420 contacts the box undercut surface 448, and another zero clearance surface where the face surface of box shoulder 440 contacts pin undercut surface 428. Thus, center-shoulder seal 400 forms a very close fitting metal-to-metal seal having mating metal-to-metal sealing surfaces which allow a build-up of stored energy within the seal upon power tightening of the assembled connection, such that upon the application of various loads on the pipe and also the connection, the seal will continue to perform and maintain sealing engagement. Notably, all of the metal-to-metal seals are formed within the axial space 450 between the sets of contacting annular faces of the center shoulder, and the metal-to-metal seals at the exterior beveled edges of shoulder seal 400, each of which exhibits radial forces, are each located immediately adjacent a respective one of the sets of contacting annular faces.

U.S. Pat. Nos. 5,765,836 and 6,041,487 disclose a center shoulder configuration, represented in FIG. 2, in which a total of at least two and up to seven metal-to-metal seals are established between the pin and box members. Three of the seven seals are frustum seals. A first outer frustum seal 120 is formed by the engagement of pin and box frustoconical surfaces at the radially outer side of the center shoulder and a second inner frustum seal 122 is formed between pin and box frustoconical surfaces at the radially inner side of the center shoulder. The third frustum seal is a center frustum seal 124 formed between intermediated pin and box center frustoconical surfaces. Two annular shoulder seals are formed. A first inner annular shoulder seal 126 a second outer annular shoulder seal 128, each by engaged annular surfaces of the pin and box members. Two cylindrical seals are also formed. A first outer cylindrical seal 130 is formed by the engagement of pin and box outer seal cylindrical surfaces at the radially outer side and a second inner cylindrical seal 132 is formed by the engagement of pin and box seal cylindrical surfaces at the radially inner side. Notably, this arrangement also places each of the metal-to-metal seals that are exposed to significant radial and hoop forces (i.e., contacting seals 122 and 120) immediately adjacent a respective one of the sets of contacting annular faces (i.e., at annular contacting seals 126 and 128) and likewise within the axial space 150 between the two annular shoulder seals.

Figure 1:
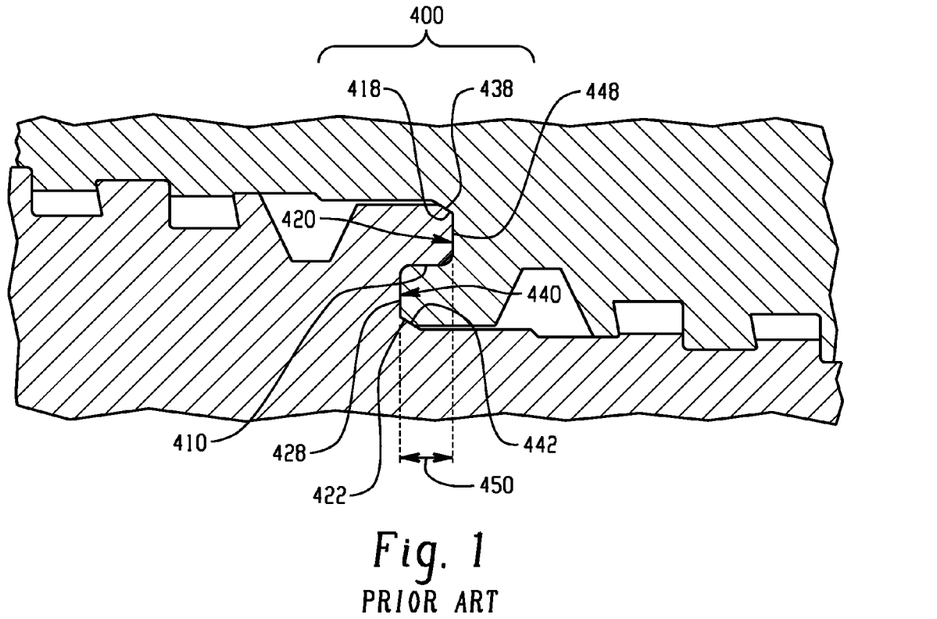
FIG. 1 is a partial cross-section of one prior art center shoulder seal arrangement.
Figure 2:
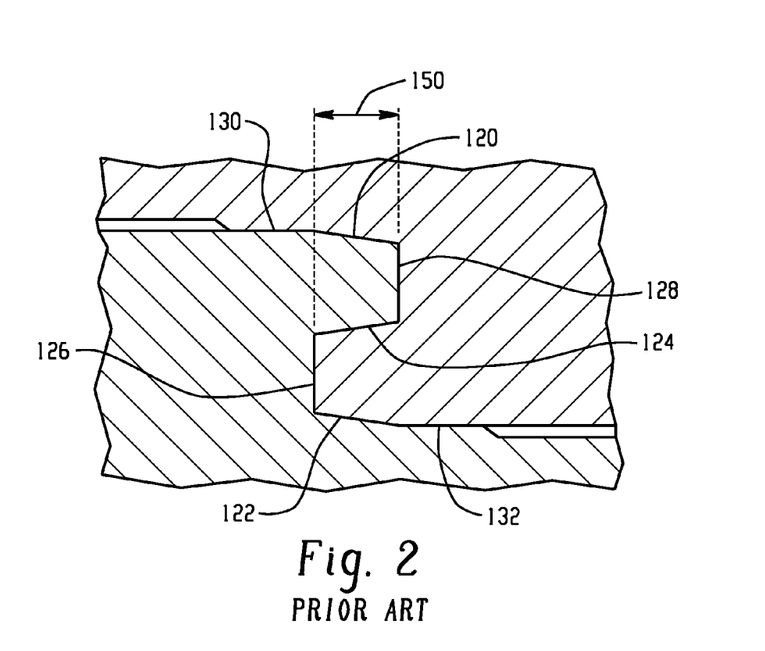
FIG. 2 is a partial cross-section of another prior art center shoulder seal arrangement.

In the center shoulder configurations of the foregoing patents, axial loading within the shoulder connections tends to produce the highest stresses proximate the axial locations of annular shoulder contact (e.g., at annular shoulder seals 126 and 128 in FIG. 2, and similarly at the annular shoulder seals formed in the arrangement of FIG. 1). Thus, highest stresses and material yield or deformation tends to occur within or near the axial region 450, 150 that, in each case, is defined between the annular shoulders of the connection.

What is needed is a center shoulder connection that provides effective sealing while avoiding potential issues of radial sealing forces in the region of the high stress and likely yield area of the center shoulder.

SUMMARY

In one aspect, a metal-to-metal sealing system connecting first and second tubular members (e.g., such as first and second oil country tubulars) includes a first seal configuration on the first tubular member and a second seal configuration on the second tubular member. The first seal configuration includes a first annular groove and a first annular tooth, the first annular groove defined by a radially inward facing undercut surface, an adjacent first annular shoulder face and an adjacent first radially outward facing surface, the first annular tooth defined by the radially inward facing undercut surface, a first annular tooth face and a second radially outward facing surface. The second seal configuration includes a second annular groove and a second annular tooth, the second annular groove defined by a radially outward facing undercut surface, an adjacent second annular shoulder face and an adjacent first radially inward facing surface, the second annular tooth defined by the radially outward facing undercut surface, a second annular tooth face and a second radially inward facing surface. The second annular tooth is positioned within the first annular groove with the second annular tooth face engaging the first annular shoulder face to define a first shoulder. The first annular tooth is positioned within the second annular groove with the first annular tooth face engaging the second annular shoulder face to define a second shoulder. A location of primary sealing contact between the first radially outward facing surface of the first tubular member and the second radially inward facing surface of the second tubular member is spaced axially away from the first shoulder; and a location of primary sealing contact between the first radially inward facing surface of the second tubular member and the second radially outward facing surface of the first tubular member is axially spaced from the second shoulder.

In one implementation of the system of the preceding paragraph, clearance is provided between the first radially outward facing surface and the second radially inward facing surface in the vicinity of the first shoulder; and clearance is provided between the first radially inward facing surface and the second radially outward facing surface in the vicinity of the second shoulder.

In one implementation of the system of either of the two preceding paragraphs, the location of primary sealing contact between the first radially outward facing surface and the second radially inward facing surface is axially spaced from the first shoulder by between about 25 thousandths of an inch and about two inches, and the location of primary sealing contact between the first radially inward facing surface and the second radially outward facing surface is axially spaced from the second shoulder by between about 25 thousandths of an inch and about one inch.

In one implementation of the system of any one of the three preceding paragraphs, a radial spacing between the first radially outward facing surface and the second radially outward facing surface in a plane of the first shoulder is between about 40 and about 500 thousandths of an inch, and a radial spacing between the first radially inward facing surface and the second radially inward facing surface in a plane of the second shoulder is between about 40 and about 500 thousandths of an inch.

In one implementation of the system of any one of the four preceding paragraphs, the radially inward facing undercut surface engages the radially outward facing undercut surface.

In one implementation of the system of any one of the five preceding paragraphs, the location of primary sealing contact between the first radially outward facing surface and the second radially inward facing surface is formed by interference between one of: (i) a frustoconical portion of the first radially outward facing surface and a frustoconical portion of the second radially inward facing surface; (ii) a frustoconical portion of the first radially outward facing surface and a curvilinear portion of the second radially inward facing surface; (iii) a curvilinear portion of the first radially outward facing surface and a frustoconical portion of the second radially inward facing surface; or (iv) a curvilinear portion of the first radially outward facing surface and a curvilinear portion of the second radially inward facing surface. Likewise, the location of primary sealing contact between the first radially inward facing surface and the second radially outward facing surface is formed by interference between one of: (i) a frustoconical portion of the first radially inward facing surface and a frustoconical portion of the second radially outward facing surface; (ii) a frustoconical portion of the first radially inward facing surface and a curvilinear portion of the second radially outward facing surface; (iii) a curvilinear portion of the first radially inward facing surface and a frustoconical portion of the second radially outward facing surface; or (iv) a curvilinear portion of the first radially inward facing surface and a curvilinear portion of the second radially outward facing surface.

In another aspect, a metal-to-metal sealing system connecting first and second tubular members includes a first seal configuration on the first tubular member and a second seal configuration on the second tubular member. The first seal configuration includes a first annular groove and a first annular tooth, the first annular groove defined by a radially inward facing undercut surface, an adjacent first annular shoulder face and an adjacent first radially outward facing surface, the first annular tooth defined by the radially inward facing undercut surface, a first annular tooth face and a second radially outward facing surface. The second seal configuration includes a second annular groove and a second annular tooth, the second annular groove defined by a radially outward facing undercut surface, an adjacent second annular shoulder face and an adjacent first radially inward facing surface, the second annular tooth defined by the radially outward facing undercut surface, a second annular tooth face and a second radially inward facing surface. The second annular tooth is positioned within the first annular groove with the second annular tooth face engaging the first annular shoulder face to define a first shoulder. The first annular tooth is positioned within the second annular groove with the first annular tooth face engaging the second annular shoulder face to define a second shoulder. The first radially outward facing surface of the first tubular member and the second radially inward facing surface of the second tubular member are configured such that a location of primary sealing contact between the surfaces lies outside of an axial region between the first shoulder and the second shoulder. Likewise, the first radially inward facing surface of the second tubular member and the second radially outward facing surface of the first tubular member are configured such that a location of primary sealing contact between the surfaces lies outside of the axial region.

In one implementation of the system of the preceding paragraph, the axial region extends from between about 20 and about 250 thousandths of an inch.

In one implementation of the system of either of the two preceding paragraphs, the location of primary sealing contact between the first radially outward facing surface and the second radially inward facing surface is external of the axial region but within at least about 1750 thousandths of an inch of the axial region; and the location of primary sealing contact between the first radially inward facing surface and the second radially outward facing surface is external of the axial region but within at least about 750 thousandths of an inch of the axial region.

In one implementation of the system of any one of the three preceding paragraphs, the location of primary sealing contact between the first radially outward facing surface and the second radially inward facing surface is formed by interference between one of: (i) a frustoconical portion of the first radially outward facing surface and a frustoconical portion of the second radially inward facing surface; (ii) a frustoconical portion of the first radially outward facing surface and a curvilinear portion of the second radially inward facing surface; (iii) a curvilinear portion of the first radially outward facing surface and a frustoconical portion of the second radially inward facing surface; or (iv) a curvilinear portion of the first radially outward facing surface and a curvilinear portion of the second radially inward facing surface. Likewise, the location of primary sealing contact between the first radially inward facing surface and the second radially outward facing surface is formed by interference between one of: (i) a frustoconical portion of the first radially inward facing surface and a frustoconical portion of the second radially outward facing surface; (ii) a frustoconical portion of the first radially inward facing surface and a curvilinear portion of the second radially outward facing surface; (iii) a curvilinear portion of the first radially inward facing surface and a frustoconical portion of the second radially outward facing surface; or (iv) a curvilinear portion of the first radially inward facing surface and a curvilinear portion of the second radially outward facing surface.

The details of one or more embodiments are set forth in the accompanying drawings and the description below. Other features, objects, and advantages will be apparent from the description and drawings, and from the claims.

DETAILED DESCRIPTION

Figure 3:
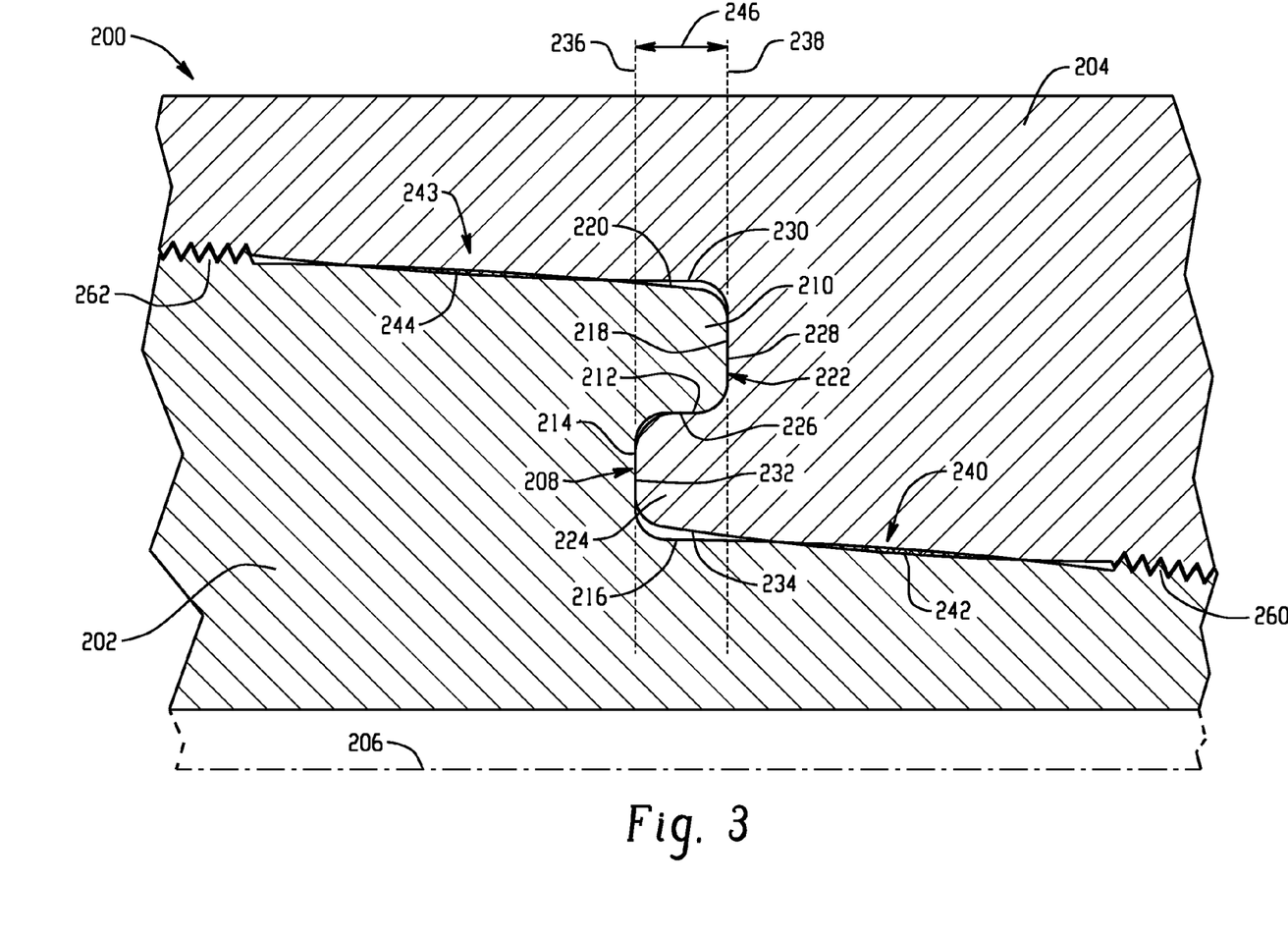
FIG. 3 is a partial cross-section of one embodiment of a center shoulder seal.

Referring to FIG. 3, a partial cross-section of a center shoulder connection 200 between two tubular members 202 and 204 is shown. Tubular member 202 forms the pin portion of the connection and tubular member 204 forms the box end of the connection. An axial centerline of the connection is shown at 206, and it is recognized that a full cross-section of the center shoulder connection would include a mirror image of the components on the opposite side of the axial centerline (i.e., below the centerline 206 in FIG. 3).

A seal configuration on tubular member 202 includes an annular groove 208 and an annular tooth 210. The annular groove 208 is defined by a radially inward facing (i.e., facing toward the centerline 206) undercut surface 212, an adjacent annular shoulder face 214 and an adjacent radially outward facing surface 216. The annular tooth is defined by the radially inward facing undercut surface 212, an annular tooth face 218 and a radially outward facing surface 220. In the illustrated embodiment, the surface 216 includes a corner radius that transitions to the shoulder face 214, and the surface 220 includes a corner radius that transitions to the tooth face 218.

A seal configuration on the tubular member 204 includes an annular groove 222 and an annular tooth 224. The annular groove 222 is defined by a radially outward facing undercut surface 226, an adjacent annular shoulder face 228 and an adjacent radially inward facing surface 230. The annular tooth 224 is defined by the radially outward facing undercut surface 226, an annular tooth face 232 and a radially inward facing surface 234. In the illustrated embodiment, the surface 230 includes a corner radius that transitions to the shoulder face 228, and the surface 234 includes a corner radius that transitions to the tooth face 232.

FIG. 3 shows the connection in made up condition, in which the annular tooth 224 is positioned within the annular groove 208 with the annular tooth face 232 engaging the annular shoulder face 214 to define one shoulder, which is represented by shoulder plane 236. Likewise, the annular tooth 210 is positioned within the annular groove 222 with the annular tooth face 218 engaging the annular shoulder face 228 to define another shoulder, which is represented by shoulder plane 238. In the illustrated embodiment the undercut surfaces 212 and 226 also engage each other, which can act as a further sealing location, as can the engaged shoulders. At opposite axial sides of the connection, engaged threaded sections or the tubular members are also shown schematically at 260 and 262.

As illustrated, clearance may be provided between the radially outward facing surface 216 and the radially inward facing surface 234 in vicinity of the shoulder plane 236. The location of primary sealing contact between the radially outward facing surface 216 and the radially inward facing surface 234, which location is shown in FIG. 3 at 240, is spaced axially away from the shoulder plane 236 to define a metal-to-metal seal contact area 242 (represented by interference of the surfaces shown in cross-hatch) that is axially spaced from the shoulder plane 236. As used herein the terminology "location of primary sealing contact" between two specified surfaces means the location of maximum contact pressure between the two surfaces. Thus, by way of example, in some embodiments surfaces 216 and 234 may make slight contact with each other in the vicinity of the shoulder plane 236 (e.g., within an axial region 246 between the shoulder planes 236 and 238) while, at the same time, the location of primary sealing contact between the surfaces 216 and 234 is spaced further away from the shoulder plane 236. Generally, the location of maximum contact pressure, and thus the location of primary sealing contact, will occur proximate the location of maximum interference between the surfaces.

Clearance may also be provided between the radially inward facing surface 230 and the radially outward facing surface 220 in vicinity of the shoulder plane 238 or, as noted above, only slight contact between the surfaces may occur in the vicinity of the shoulder plane 238. Regardless, the location of primary sealing contact between the radially inward facing surface 230 and the radially outward facing surface 220, which location is shown in FIG. 3 at 243, is spaced axially away from the shoulder plane 238 to define a metal-to-metal seal contact area 244 (represented by interference of the surfaces shown in cross-hatch) that is axially spaced from the shoulder plane 238. Notably, in the case of both primary seal contact areas 242 and 244 of the illustrated embodiment, the location of primary sealing contact is located outside of the axial region 246 of the connection defined between the two shoulders planes 236 and 238.

The exact location of primary sealing contact between the surfaces (e.g., 216 and 234 or 220 and 230) can vary based upon various factors, including the necessary torque limit required in the connection, as well as thickness and diameter of the tubular connection.

By way of example: the location of primary sealing contact 240 may be axially spaced from the shoulder plane 236 by between about 25 thousandths of an inch and about one inch; the location of primary sealing contact 243 may be axially spaced from the shoulder plane 238 by between about 25 thousandths of an inch and about one inch; the axial region 246 may extend from between about 20 thousandths of an inch and about 250 thousandths of an inch; a radial spacing between the radially outward facing surface 216 and the radially outward facing surface 220 in the shoulder plane 236 may be between about 40 thousandths of an inch and about 500 thousandths of an inch; and a radial spacing between the radially inward facing surface 230 and the radially inward facing surface 234 in the shoulder plane 238 may be between about 40 thousandths of an inch and about 500 thousandths of an inch.

In the illustrated embodiment, each of the surfaces 216, 220, 230 and 234 are shown as curvilinear surfaces. Such curvilinear surfaces may, by way of example, when considered in two dimensions along a plane that extends through and runs parallel to the central axis 206 of the connection, include elliptical curves, circular curves, varying radius curves of any suitable type (e.g., curve radius generally between about 0.5" and about 15" for most effective sealing), or combinations thereof, and the corresponding 3-D surface shapes produced upon rotation of any such curve about the central axis 206 of the connection. However, it is recognized that the surfaces need not be entirely curvilinear or, for that matter, curvilinear at all. For example, in one possible modified version of the embodiment of FIG. 3, surfaces 220 and 234 remain curvilinear, but surfaces 216 and 230 are made frustoconical, such that each location of primary sealing contact 240 and 243 is made with respect to an interference between a curvilinear surface and a frustoconical surface.

Figure 4:
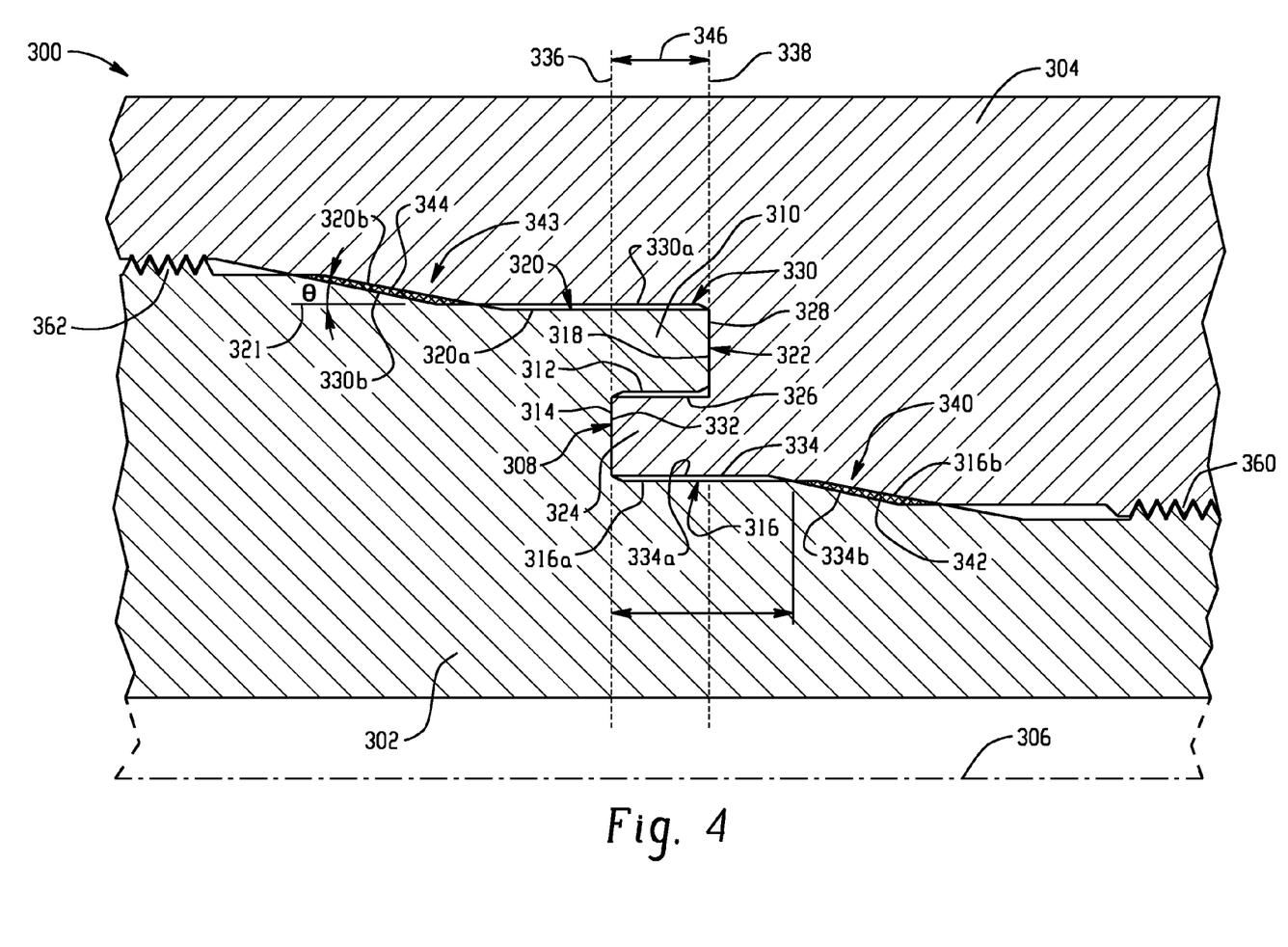
FIG. 4 is a partial cross-section of another embodiment of a center shoulder seal.

Referring to the alternative embodiment shown in FIG. 4, an embodiment of a center shoulder seal configuration 300 with axial centerline 306 in which the primary metal-to-metal contact seals are not formed by curvilinear surface portions is shown. In this arrangement, the pin end on tubular member 302 includes an annular groove 308 and an annular tooth 310. The annular groove 308 is defined by a radially inward facing (i.e., facing toward the centerline 306) undercut surface 312, an adjacent annular shoulder face 314 and an adjacent radially outward facing surface 316. The annular tooth is defined by the radially inward facing undercut surface 312, an annular tooth face 318 and a radially outward facing surface 320. The box end on tubular member 304 includes an annular groove 322 and an annular tooth 324. The annular groove 322 is defined by a radially outward facing undercut surface 326, an adjacent annular shoulder face 328 and an adjacent radially inward facing surface 330. The annular tooth 324 is defined by the radially outward facing undercut surface 326, an annular tooth face 332 and a radially inward facing surface 334.

Surface 316 includes cylindrical portion 316a and frustoconical portion 316b, while surface 334 includes cylindrical portion 334a and frustoconical portion 334b. Clearance may be provided between surface portions 316a and 334a, but the frustoconical portions 316b and 334b interfere in a manner to produce a location of primary sealing contact 340 that is axially spaced from shoulder plane 336, represented by interference contact area 342. Surface 320 includes cylindrical portion 320a and frustoconical portion 320b, while surface 330 includes cylindrical portion 330a and frustoconical portion 330b. Clearance may be provided between surface portions 320a and 330a, but the frustoconical portions 320b and 330b interfere in a manner to produce a location of primary sealing contact 343 that is axially spaced from shoulder plane 338, represented by interference contact area 344. To be most effective, the conical angle of each frustoconical portion 316b, 334b, 320b, 330b relative to the central axis 306 of the connection (e.g., represented in one instance in FIG. 4 by angle $\ominus$ relative to line 321 that runs parallel to the central axis 306), as well as the conical angle of other embodiments incorporating frustoconicaly surface portions, may be between about 1° and about 7°. Engaged threaded sections 360 and 362 on opposite axial sides of the center shoulder are also shown. The axial locations of the seals and the radial thickness of the tubular members may be similar to that mentioned above with respect to the embodiment of FIG. 3.

Still other variations are possible. It is recognized that either of the primary metal-to-metal contact seals, which are axially spaced from the shoulders, may be formed by (i) a frustoconical portion of one surface and a frustoconical portion of the other surface; (ii) a frustoconical portion of the one surface and a curvilinear portion of the other surface; (iii) a curvilinear portion of the one surface and a frustoconical portion of the other surface; or (iv) a curvilinear portion of the one surface and a curvilinear portion of the other surface.

Generally, each of the pin part and box part may be produced using a lathe process with cutting inserts profiled to produce the desired center shoulder configuration on each part. By properly specifying, selecting and machining the radial location of each of the radially outward facing and radially inward facing surfaces, and each point along such surfaces, from the intended centerline, the locations of maximum interference can be preselected to position the locations of primary sealing contact axially away from the shoulders of the connection.

Figure 5:
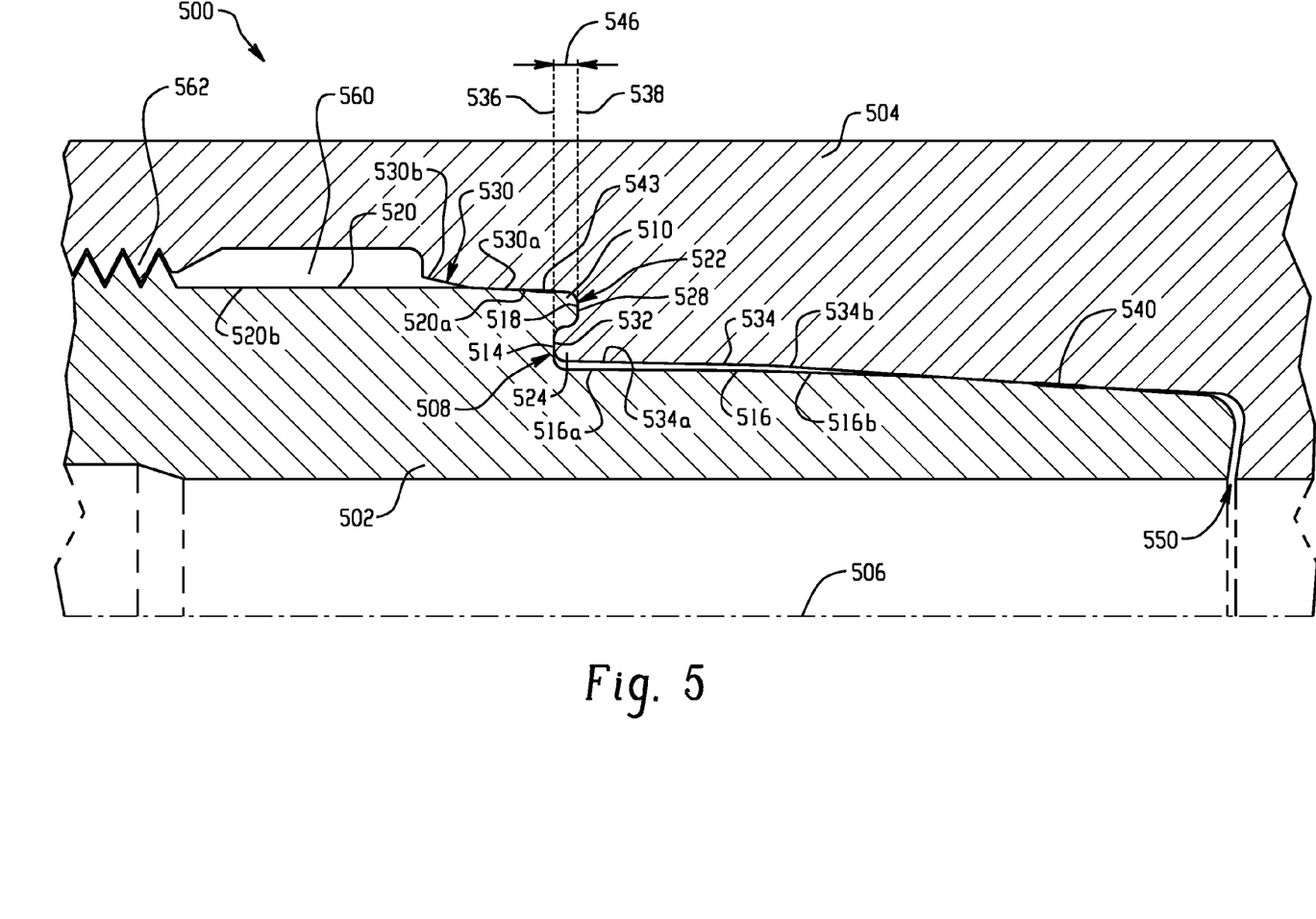
FIG. 5 is a partial cross-section of another embodiment of a center-shoulder seal in which the location of primary sealing contact to opposite sides of the connection includes engaged threads to one side of the center-shoulder, but lacks any engaged threads to the other side of the center-shoulder.

Referring now to FIG. 5, an embodiment of a center shoulder seal configuration 500 with axial centerline 506 in which one side of the connection lacks engaged threads is shown. In this arrangement, the pin end on tubular member 502 includes an annular groove 508 and an annular tooth 510. As in the previous embodiments, the annular groove 508 is defined by a radially inward facing (i.e., facing toward the centerline 506) undercut surface, an adjacent annular shoulder face 514 and an adjacent radially outward facing surface 516. The annular tooth 510 is defined by the radially inward facing undercut surface, an annular tooth face 518 and a radially outward facing surface 520. The box end on tubular member 504 includes an annular groove 522 and an annular tooth 524. The annular groove 522 is defined by a radially outward facing undercut surface, an adjacent annular shoulder face 528 and an adjacent radially inward facing surface 530. The annular tooth 524 is defined by the radially outward facing undercut surface, an annular tooth face 532 and a radially inward facing surface 534.

In the illustrated embodiment, surface 516 and surface 534 are configured such that the location of primary sealing contact 540 is spaced further from the axial region 546 between the shoulder planes 536 and 538 than the location of primary sealing contact 543 between surfaces 520 and 530. In this arrangement, the location of primary sealing contact 540 may be axially spaced from the shoulder plane 536 by between about 25 thousandths of an inch and about two inches; the location of primary sealing contact 543 may be axially spaced from the shoulder plane 538 by between about 25 thousandths of an inch and about one inch; the axial region 546 may extend from between about 20 thousandths of an inch and about 250 thousandths of an inch; a radial spacing between the radially outward facing surface 516 and the radially outward facing surface 520 in the shoulder plane 536 may be between about 40 thousandths of an inch and about 500 thousandths of an inch; and a radial spacing between the radially inward facing surface 530 and the radially inward facing surface 534 in the shoulder plane 538 may be between about 40 thousandths of an inch and about 500 thousandths of an inch. In this case the location of primary sealing contact 540 will generally be within 1.75 inches of the axial region 546.

Surfaces 516 and 534 include respective cylindrical surface portions 516A and 534A with clearance provided. Surface portion 516A is followed by a curvilinear surface portion 516B, and surface portion 534A is followed by a frustoconical surface portion 534B, with location of primary sealing contact 540 occurring between portions 516B and 534B. Surface 530 includes a frustoconical portion 530A, followed by another, steeper frustoconical portion 530B, and surface 520 includes a curvilinear portion 520A that transitions to a cylindrical portion 520B. The location of primary sealing contact is between surface portion 530A and surface portion 520A. It is noted that other surface variations are possible as previously discussed. Engaged threaded sections 562 are located to one side of the center-shoulder, specifically the side that is closer to the outer diameter of the connection, while the opposite side of the connection lacks any engaged threads. Notably, on this opposite side of connection a gap 550 may be provided between the pin nose shoulder face and the box shoulder face as shown to prevent the pin nose section from yielding due to torque, compression and expansion of the material at high temperatures. The faces may, however, come into contact, such as at make-up, during compression or during material expansion. Also shown is a dope relief recess 560 in the surface 530 of box member 504 that will take-up excess thread dope as the connection makes up.

The configuration of FIG. 5 is particularly suited for use in connection with tubulars used in the geothermal markets, such as the steam assisted gravity drainage market. Although the FIG. 5 embodiment lacks any engaged threaded section at one side of the connection, it is recognized that variations are possible, including implementations in which an engaged threaded section is also provided on the side of the connection that includes the location of primary sealing contact 540 that is spaced further from the axial shoulder region 546.

Thus, a method of producing tubular members with a center shoulder that separates metal-to-metal seals from high stress areas of the center shoulder is provided. The method involves: producing first and second tubular members, each with a pin end and a box end, where: (a) each pin end includes: a center shoulder configuration having a first annular groove and a first annular tooth, the first annular groove defined by a radially inward facing undercut surface, an adjacent first annular shoulder face and an adjacent first radially outward facing surface, the first annular tooth defined by the radially inward facing undercut surface, a first annular tooth face and a second radially outward facing surface, and at least a first threaded section on a larger diameter side the center shoulder configuration; (b) each box end includes: a center shoulder configuration having a second annular groove and a second annular tooth, the second annular groove defined by a radially outward facing undercut surface, an adjacent second annular shoulder face and an adjacent first radially inward facing surface, the second annular tooth defined by the radially outward facing undercut surface, a second annular tooth face and a second radially inward facing surface, and at least a first threaded section on a larger diameter side of the center shoulder configuration; (c) the center shoulder configuration and first threaded section of the pin end of the first tubular member configured for mating connection with the center shoulder configuration and first threaded section of the box end of the second tubular member such that upon make-up of the pin end of the first tubular member with the box end of the second tubular member: (i) the second annular tooth will be positioned within the first annular groove with the second annular tooth face engaging the first annular shoulder face to define a first shoulder and the first annular tooth will be positioned within the second annular groove with the first annular tooth face engaging the second annular shoulder face to define a second shoulder; (ii) a location of primary sealing contact between the first radially outward facing surface of the pin end of the first tubular member and the second radially inward facing surface of the box end of the second tubular member will be axially spaced apart from the first shoulder; and (iii) a location of primary sealing contact between the first radially inward facing surface of the box end of the second tubular member and the second radially outward facing surface of the pin end of the first tubular member will be axially spaced apart from the second shoulder.

Likewise, a method of connecting tubular members for use within an oil or gas well is provided and involves: (a) utilizing first and second tubular members, each with a pin end and a box end, where: (i) each pin end includes: a center shoulder configuration having a first annular groove and a first annular tooth, the first annular groove defined by a radially inward facing undercut surface, an adjacent first annular shoulder face and an adjacent first radially outward facing surface, the first annular tooth defined by the radially inward facing undercut surface, a first annular tooth face and a second radially outward facing surface, and at least a first threaded section on a larger diameter side of the center shoulder configuration, and (ii) each box end includes: a center shoulder configuration having a second annular groove and a second annular tooth, the second annular groove defined by a radially outward facing undercut surface, an adjacent second annular shoulder face and an adjacent first radially inward facing surface, the second annular tooth defined by the radially outward facing undercut surface, a second annular tooth face and a second radially inward facing surface, and at least a first threaded section on a larger diameter side of the center shoulder configuration; (b) engaging the pin end of the first tubular member with the box end of the second tubular member; (c) producing relative rotation between the first tubular member and the second tubular member such that interaction of the first threaded sections of the first and second tubular members moves the first and second tubular members together; and (d) completing make up of the pin end of the first tubular member and the box end of the second tubular member such that: (i) the second annular tooth is positioned within the first annular groove with the second annular tooth face engaging the first annular shoulder face to define a first shoulder and the first annular tooth is positioned within the second annular groove with the first annular tooth face engaging the second annular shoulder face to define a second shoulder; (ii) a location of primary sealing contact between the first radially outward facing surface of the pin end of the first tubular member and the second radially inward facing surface of the box end of the second tubular member is axially spaced apart from the first shoulder; and (iii) a location of primary sealing contact between the first radially inward facing surface of the box end of the second tubular member and the second radially outward facing surface of the pin end of the first tubular member is axially spaced apart from the second shoulder.

It is to be clearly understood that the above description is intended by way of illustration and example only, is not intended to be taken by way of limitation, and that other changes and modifications are possible.

What is claimed is:

1. A metal-to-metal sealing system connecting first and second tubular members comprising:

a metal-to-metal sealing system connecting first and second tubular members comprising: a first seal configuration on the first tubular member including a first annular groove and a first annular tooth, the first annular groove defined by a radially inward facing undercut surface, an adjacent first annular shoulder face and an adjacent first radially outward facing surface, the first annular tooth defined by the radially inward facing undercut surface, a first annular tooth face and a second radially outward facing surface;

a second seal configuration on the second tubular member including a second annular groove and a second annular tooth, the second annular groove defined by a radially outward facing undercut surface, an adjacent second annular shoulder face and an adjacent first radially inward facing surface, the second annular tooth defined by the radially outward facing undercut surface, a second annular tooth face and a second radially inward facing surface; wherein the second annular tooth is positioned within the first annular groove with the second annular tooth face engaging the first annular shoulder face to define a first shoulder;

wherein the first annular tooth is positioned within the second annular groove with the first annular tooth face engaging the second annular shoulder face to define a second shoulder;

wherein a location of primary sealing contact between the first radially outward facing surface of the first tubular member and the second radially inward facing surface of the second tubular member is spaced axially away from the first shoulder, such that there is a first axial distance between the first shoulder and the location of the primary sealing contact;

wherein the location of primary sealing contact between the first radially inward facing surface of the second tubular member and the second radially outward facing surface of the first tubular member is axially spaced from the second shoulder, such that there is a second axial distance between the second shoulder and the location of the primary sealing contact.

2. The system of claim 1 wherein:
clearance is provided between the first radially outward facing surface and the second radially inward facing surface adjacent to the first shoulder; and
clearance is provided between the first radially inward facing surface and the second radially outward facing surface adjacent to the second shoulder.

3. The system of claim 1 wherein the location of primary sealing contact between the first radially outward facing surface and the second radially inward facing surface is axially spaced from the first shoulder by a greater distance than the location of primary sealing contact between the first radially inward facing surface and the second radially outward facing surface.

4. The system of claim 1 wherein the location of primary sealing contact between the first radially outward facing surface and the second radially inward facing surface is axially spaced from the first shoulder by between about 25 thousandths of an inch and about two inches, and the location of primary sealing contact between the first radially inward facing surface and the second radially outward facing surface is axially spaced from the second shoulder by between about 25 thousandths of an inch and about one inch.

5. The system of claim 1 wherein a radial spacing between the first radially outward facing surface and the second radially outward facing surface in a plane of the first shoulder is between about 40 and about 500 thousandths of an inch, and a radial spacing between the first radially inward facing surface and the second radially inward facing surface in a plane of the second shoulder is between about 40 and about 500 thousandths of an inch.

6. The system of claim 1 wherein the radially inward facing undercut surface engages the radially outward facing undercut surface.

7. The system of claim 1 wherein:
the location of primary sealing contact between the first radially outward facing surface and the second radially inward facing surface is formed by interference between one of:
(i) a frustoconical portion of the first radially outward facing surface and a frustoconical portion of the second radially inward facing surface;
(ii) a frustoconical portion of the first radially outward facing surface and a curvilinear portion of the second radially inward facing surface;
(iii) a curvilinear portion of the first radially outward facing surface and a frustoconical portion of the second radially inward facing surface; or
(iv) a curvilinear portion of the first radially outward facing surface and a curvilinear portion of the second radially inward facing surface;
the location of primary sealing contact between the first radially inward facing surface and the second radially outward facing surface is formed by interference between one of:
(i) a frustoconical portion of the first radially inward facing surface and a frustoconical portion of the second radially outward facing surface;
(ii) a frustoconical portion of the first radially inward facing surface and a curvilinear portion of the second radially outward facing surface;
(iii) a curvilinear portion of the first radially inward facing surface and a frustoconical portion of the second radially outward facing surface; or
(iv) a curvilinear portion of the first radially inward facing surface and a curvilinear portion of the second radially outward facing surface.

8. The system of claim 1 wherein the first radially outward facing surface of the first tubular member and the second radially inward facing surface of the second tubular member are configured such that the location of primary sealing contact between the surfaces lies outside of an axial region between the first shoulder and the second shoulder and wherein the first radially inward facing surface of the second tubular member and the second radially outward facing surface of the first tubular member are configured such that the location of primary sealing contact between the surfaces lies outside of the axial region.

9. The system of claim 8 wherein the axial region extends from between about 20 and about 250 thousandths of an inch.

10. A metal-to-metal sealing system connecting first and second tubular members comprising:
a first seal configuration on the first tubular member including a first annular groove and a first annular tooth, the first annular groove defined by a radially inward facing undercut surface, an adjacent first annular shoulder face and an adjacent first radially outward facing surface, the first annular tooth defined by the radially inward facing undercut surface, a first annular tooth face and a second radially outward facing surface;
a second seal configuration on the second tubular member including a second annular groove and a second annular tooth, the second annular groove defined by a radially outward facing undercut surface, an adjacent second annular shoulder face and an adjacent first radially inward facing surface, the second annular tooth defined by the radially outward facing undercut surface, a second annular tooth face and a second radially inward facing surface;

wherein the second annular tooth is positioned within the first annular groove with the second annular tooth face engaging the first annular shoulder face to define a first shoulder; wherein the first annular tooth is positioned within the second annular groove with the first annular tooth face engaging the second annular shoulder face to define a second shoulder;

wherein the first radially outward facing surface of the first tubular member and the second radially inward facing surface of the second tubular member are configured such that the location of primary sealing contact between the surfaces lies outside of an axial region between the first shoulder and the second shoulder, such that there is a first axial distance between the first shoulder and the location of the primary sealing contact;

wherein the first radially inward facing surface of the second tubular member and the second radially outward facing surface of the first tubular member are configured such that a location of primary sealing contact between the surfaces lies outside of the axial region, such that there is a second axial distance between the second shoulder and the location of the primary sealing contact.

11. The system of claim 10 wherein the axial region extends from between about 20 and about 250 thousandths of an inch.

12. The system of claim 10 wherein:
the location of primary sealing contact between the first radially outward facing surface and the second radially inward facing surface is external of the axial region but within at least about 1750 thousandths of an inch of the axial region;
wherein the location of primary sealing contact between the first radially inward facing surface and the second radially outward facing surface is external of the axial region but within at least about 750 thousandths of an inch of the axial region.

13. The system of claim 10 wherein:
the location of primary sealing contact between the first radially outward facing surface and the second radially inward facing surface is formed by interference between one of:
(i) a frustoconical portion of the first radially outward facing surface and a frustoconical portion of the second radially inward facing surface;
(ii) a frustoconical portion of the first radially outward facing surface and a curvilinear portion of the second radially inward facing surface;
(iii) a curvilinear portion of the first radially outward facing surface and a frustoconical portion of the second radially inward facing surface; or
(iv) a curvilinear portion of the first radially outward facing surface and a curvilinear portion of the second radially inward facing surface;
the location of primary sealing contact between the first radially inward facing surface and the second radially outward facing surface is formed by interference between one of:
(i) a frustoconical portion of the first radially inward facing surface and a frustoconical portion of the second radially outward facing surface;
(ii) a frustoconical portion of the first radially inward facing surface and a curvilinear portion of the second radially outward facing surface;
(iii) a curvilinear portion of the first radially inward facing surface and a frustoconical portion of the second radially outward facing surface; or
(iv) a curvilinear portion of the first radially inward facing surface and a curvilinear portion of the second radially outward facing surface.

14. A method of producing tubular members with a center shoulder that separates metal-to-metal seals from high stress areas of the center shoulder:
producing first and second tubular members, each with a pin end and a box end, where:
each pin end includes: a center shoulder configuration having a first annular groove and a first annular tooth, the first annular groove defined by a radially inward facing undercut surface, an adjacent first annular shoulder face and an adjacent first radially outward facing surface, the first annular tooth defined by the radially inward facing undercut surface, a first annular tooth face and a second radially outward facing surface, and at least a first threaded section on a side of the center shoulder configuration;
each box end includes: a center shoulder configuration having a second annular groove and a second annular tooth, the second annular groove defined by a radially outward facing undercut surface, an adjacent second annular shoulder face and an adjacent first radially inward facing surface, the second annular tooth defined by the radially outward facing undercut surface, a second annular tooth face and a second radially inward facing surface, and at least a first threaded section on a side of the center shoulder configuration;
the center shoulder configuration and first threaded section of the pin end of the first tubular member configured for mating connection with the center shoulder configuration and first threaded section of the box end of the second tubular member and sized such that upon make-up of the pin end of the first tubular member with the box end of the second tubular member:
the second annular tooth will be positioned within the first annular groove with the-second annular tooth face engaging the first annular shoulder face to define a first shoulder and the first annular tooth will be positioned within the second annular groove with the first annular tooth face engaging the second annular shoulder face to define a second shoulder;
the location of primary sealing contact between the first radially outward facing surface of the pin end of the first tubular member and the second radially inward facing surface of the box end of the second tubular member will be axially spaced apart from the first shoulder, such that there is a first axial distance between the first shoulder and the location of the primary sealing contact; and
the location of primary sealing contact between the first radially inward facing surface of the box end of the second tubular member and the second radially outward facing surface of the pin end of the first tubular member will be axially spaced apart from the second shoulder, such that there is a second axial distance between the second shoulder and the location of the primary sealing contact.

15. The method of claim 14 wherein:
clearance is provided between the first radially outward facing surface and the second radially inward facing surface adjacent to the first shoulder; and clearance is provided between the first radially inward facing surface and the second radially outward facing surface adjacent to the second shoulder.

16. The method of claim 14 wherein the location of primary sealing contact between the first radially outward facing surface and the second radially inward facing surface is axially spaced from the first shoulder by a greater distance than the location of primary sealing contact between the first radially inward facing surface and the second radially outward facing surface.

17. The method of claim 14 wherein the location of primary sealing contact between the first radially outward facing surface and the second radially inward facing surface is axially spaced from the first shoulder by between about 25 thousandths of an inch and about two inches, and the location of primary sealing contact between the first radially inward facing surface and the second radially outward facing surface is axially spaced from the second shoulder by between about 25 thousandths of an inch and about one inch.

18. The method of claim 14 wherein a radial spacing between the first radially outward facing surface and the second radially outward facing surface in a plane of the first shoulder is between about 40 and about 500 thousandths of an inch, and a radial spacing between the first radially inward facing surface and the second radially inward facing surface in a plane of the second shoulder is between about 40 and about 500 thousandths of an inch.

19. The method of claim 14 wherein the radially inward facing undercut surface engages the radially outward facing undercut surface.

20. The method of claim 14 wherein:
the location of primary sealing contact between the first radially outward facing surface and the second radially inward facing surface is formed by interference between one of:
(i) a frustoconical portion of the first radially outward facing surface and a frustoconical portion of the second radially inward facing surface;
(ii) a frustoconical portion of the first radially outward facing surface and a curvilinear portion of the second radially inward facing surface;
(iii) a curvilinear portion of the first radially outward facing surface and a frustoconical portion of the second radially inward facing surface; or
(iv) a curvilinear portion of the first radially outward facing surface and a curvilinear portion of the second radially inward facing surface;
the location of primary sealing contact between the first radially inward facing surface and the second radially outward facing surface is formed by interference between one of:
(i) a frustoconical portion of the first radially inward facing surface and a frustoconical portion of the second radially outward facing surface;
(ii) a frustoconical portion of the first radially inward facing surface and a curvilinear portion of the second radially outward facing surface;
(iii) a curvilinear portion of the first radially inward facing surface and a frustoconical portion of the second radially outward facing surface; or
(iv) a curvilinear portion of the first radially inward facing surface and a curvilinear portion of the second radially outward facing surface.

21. The method of claim 14 wherein the first radially outward facing surface of the first tubular member and the second radially inward facing surface of the second tubular member are configured such that the location of primary sealing contact between the surfaces lies outside of an axial region between the first shoulder and the second shoulder and wherein the first radially inward facing surface of the second tubular member and the second radially outward facing surface of the first tubular member are configured such that the location of primary sealing contact between the surfaces lies outside of the axial region.

22. The method of claim 21 wherein the axial region extends from between about 20 and about 250 thousandths of an inch.

23. A method of connecting tubular members, comprising:
(a) utilizing first and second tubular members, each with a pin end and a box end, where:
each pin end includes: a center shoulder configuration having a first annular groove and a first annular tooth, the first annular groove defined by a radially inward facing undercut surface, an adjacent first annular shoulder face and an adjacent first radially outward facing surface, the first annular tooth defined by the radially inward facing undercut surface, a first annular tooth face and a second radially outward facing surface, and at least a first threaded section on a side of the center shoulder configuration, and
each box end includes: a center shoulder configuration, having a second annular groove and a second annular tooth, the second annular groove defined by a radially outward facing undercut surface, an adjacent second annular shoulder face and an adjacent first radially inward facing surface, the second annular tooth defined by the radially outward facing undercut surface, a second annular tooth face and a second radially inward facing surface, and at least a first threaded section on a side of the center shoulder configuration;
(b) engaging the pin end of the first tubular member with the box end of the second tubular member;
(c) producing relative rotation between the first tubular member and the second tubular member such that interaction of at least a first threaded section of each of the the first and second tubular members moves the first and second tubular members together;
(d) completing make-up of the pin end of the first tubular member and the box end of the second tubular member such that: the second annular tooth is positioned within the first annular groove with the second annular tooth face engaging the first annular shoulder face to define a first shoulder and the first annular tooth is positioned within the second annular groove with the first annular tooth face engaging the second annular shoulder face to define a second shoulder;
the location of primary sealing contact between the first radially outward facing surface of the pin end of the first tubular member and the second radially inward facing surface of the box end of the second tubular member is axially spaced apart from the first shoulder, such that there is a first axial distance between the first shoulder and the location of the primary sealing contact; and
the location of primary sealing contact between the first radially inward facing surface of the box end of the second tubular member and the second radially outward facing surface of the pin end of the first tubular member is axially spaced apart from the second shoulder, such that there is a second axial distance between the second shoulder and the location of the primary sealing contact.

* * * * *